United States Patent
Kweon et al.

(10) Patent No.: US 6,749,965 B1
(45) Date of Patent: Jun. 15, 2004

(54) POSITIVE ACTIVE MATERIAL FOR LITHIUM SECONDARY BATTERIES AND METHOD OF PREPARING THE SAME

(75) Inventors: Ho-Jin Kweon, Cheonan-si (KR); Hyun-Sook Jung, Cheonan-si (KR); Geun-Bae Kim, Cheonan-si (KR); Dong-Gon Park, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 108 days.

(21) Appl. No.: 09/595,075

(22) Filed: Jun. 16, 2000

Related U.S. Application Data

(63) Continuation-in-part of application No. 09/248,202, filed on Feb. 10, 1999, now Pat. No. 6,372,385.

(30) Foreign Application Priority Data

Jun. 17, 1999 (KR) ........................ 1999-22765

(51) Int. Cl.[7] ........................ H01M 4/40; H01M 4/52
(52) U.S. Cl. ........................ 429/231.1; 429/231.3; 429/231.5; 429/223; 429/231.6
(58) Field of Search ........................ 429/218.1, 223, 429/231.1, 231.3, 231.5, 231.6

(56) References Cited

U.S. PATENT DOCUMENTS

| | | | |
|---|---|---|---|
| 5,705,291 A | * | 1/1998 | Amatucci et al. ........... 429/137 |
| 6,037,095 A | * | 3/2000 | Miyasaka ................ 429/218.1 |
| 6,365,299 B1 | * | 4/2002 | Miyaki et al. ........... 429/218.1 |
| 6,372,385 B1 | * | 4/2002 | Kweon et al. ......... 429/231.95 |

FOREIGN PATENT DOCUMENTS

| | | | |
|---|---|---|---|
| JP | 61 007 577 | * | 1/1986 |
| JP | 04-300153 | | 9/1993 |
| JP | 05-050227 | | 9/1994 |
| JP | 8-236114 | * | 9/1996 |
| JP | 08-131094 | | 11/1997 |
| WO | WO 97/49136 | * | 12/1997 |
| WO | WO 00/70694 | * | 12/2000 |

* cited by examiner

*Primary Examiner*—Patrick Ryan
*Assistant Examiner*—Tracy Dove
(74) *Attorney, Agent, or Firm*—Blakely, Sokoloff, Taylor & Zafman

(57) ABSTRACT

Disclosed is a positive active material for a lithium secondary battery having high capacity and long durability properties and particularly to a powder of $Li_aNi_{1-x-y}C O_xM_yO_2$, $Li_aNi_{1-x-y}C O_xM_yO_{2-z}F_z$ or $Li_aNi_{1-x-y}C O_xM_yO_{2-z}S_z$ (where M is a metal selected from the group consisting of Al, Mg, Sr, La, Ce, V, and Ti and wherein $0 \leq 0.99$, $0.01 \leq y \leq 0.1$, $0.01 \leq z \leq 0.1$, and $1.00 \leq a \leq 1.1$) is surface-treated by a metal alkoxide solution whereby the durability, capacity and structural safety of said positive active material is increased.

8 Claims, 3 Drawing Sheets

US 6,749,965 B1

POSITIVE ACTIVE MATERIAL FOR LITHIUM SECONDARY BATTERIES AND METHOD OF PREPARING THE SAME

CROSS REFERENCE TO RELATED APPLICATION

This application is a continuation-in-Part of U.S. application Ser. No. 09/248,202, filed Feb. 10, 1999, now U.S. Pat. No. 6,372,385; as prior application for which the pending application claims the benefit. This application is based on application No. 99-22765, filed in the Korean Industrial Property Office on Jun. 17, 1999, the content of which is incorporated hereinto by reference.

BACKGROUND OF THE INVENTION (a) Field of the Invention

The present invention relates to a positive active material for lithium (Li) secondary battery and a method of preparing the same, and more particularly, to a positive active material for lithium secondary battery, the surface properties of which have been transformed by surface-treating a positive material of $Li_aNi_{1-x-y}Co_xM_yO_2$, $Li_aNi_{1-x-y}Co_xM_yO_{2-z}$ or $Li_aNi_{1-x-y}Co_xM_yO_{2-z}S_z$ with a metal alkoxide solution, and a method of preparing the same.

(b) Description of the Related Art

Due to advancing appliances miniaturization, weight reduction, and increased functionality of cordless portable appliances such as video cameras, personal phones, and personal computers, there are escalating requirements for the sources of electric power used to driving these appliances. Particularly, there have been advances in developing and studying rechargeable lithium secondary battery around the world, anticipating the need for a battery with a high energy density.

A lithium secondary battery uses as an anode and a cathode materials which can intercalate and deintercalate lithium ions, and is prepared by filling organic or polymer electrolyte between the cathode and the anode in order to move the lithium ions. The battery generates electric energy by a redox reaction when lithium ions intercalate and deintercalate in the cathode and in the anode.

Lithium secondary batteries use carbon materials or lithium metals as an anode and intercalatable/deintercalatable chalcogenide compounds as a cathode. Carbon materials are substituted for lithium metals because the latter, when used as an anode, has the disadvantage of educing dendrites with the associated danger of explosion and reduction of the recharging efficiency.

On the other hand, complex metal oxide such as $LiCoO_2$, $LiMn_2O_4$, $LiNi_{1-x}Co_xO_2$ (0<X<1), and $LiMnO_2$ are now being studied for a cathode use because chrome oxide, $MnO_2$, etc. that were initially used have problems with low recharge efficiency and safety.

Lithium secondary batteries using nickelic positive active materials have the potential to make high capacity batteries due to their high discharge capacity, but more development of nickelic active materials is needed to overcome defects associated with their low durability performance and the structural instability of $LiNi_{1-x}Co_xO_2$ (0<x<1).

Synthesizing methods employing solid state processes, co-precipitation methods, polymer chelating agents, etc, have been developed and researched thus far on $LiNi_{1-x}M_xO_2$ (0<x<1) powder with some Ni substituted with Co, Mn, etc, for improving structural safety features, discharge capacities, and life span properties of the basic nickel based cathode compound, $LiNiO_2$.

$LiNiO_2$ has disadvantages in that it is difficult to synthesize and is not practical to use in a battery because of poor durability, in spite of its having a recharge capacity of 200 mAh/g.

There is also a problem with $LiCoO_2$ in that it has low stability at high current discharges. However, $LiCoO_2$ has been used widely due to its excellent electrode properties, high battery voltage, and a conductance ranging from $10^{-2}$ to 1 S/cm at room temperature.

To overcome these defects, Korea patent application No. 97-56444 recently disclosed $LiNi_{1-x}M_xO_2$ powder with Co or Mn substituting some Ni, and $LiNi_{1-x-y}Co_xM_yO_2$ (where M=Al, Mg, Sr, La, Ce, etc.: 0<x<1, 0<y<1) powder which added a little bit of a third non-Cobalt metal. Also, U.S. Pat. No. 5,773,168 discloses an active material replaces F for some oxygen in $LiNiO_2$.

However, there still are difficulties with the structural stability and low durability performance, despite inventions addressing the problems of the conventional art.

SUMMARY OF THE INVENTION

It is an object of the present invention to provide a positive active material for a Li secondary battery, wherein $Li_aNi_{1-x-y}Co_xM_yO_2$, $Li_aNi_{1-x-y}Co_xM_yO_{2-z}F_z$, and $Li_aNi_{1-x-y}Co_xM_yO_{2-z}S_z$ (where M is a metal selected from the group consisting of Al, Mg, Sr, La, Ce, V, and Ti and wherein $0 \leq x \leq 0.99$, $0.01 \leq y < 0.1$, $0.01 \leq z \leq 0.1$ and $1.00 \leq a \leq 1.1$) powders are synthesized and then coated with a metal oxide by using a metal alkoxide solution to improve the durability, capacity, and structural stability of the battery by transforming surface structures, since surface physical properties are the most important factor affecting an electrical chemical reaction by coating the surface using a metal alkoxide solution.

It is another object to provide a method of preparation of a coated positive active material for a Li secondary battery by using a metal alkoxide solution.

In order to achieve these other objects, the present invention provides positive active materials for Li secondary battery that are coated by using a metal alkoxide solution with materials selected from the group consisting of the following:

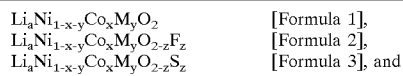

| | |
|---|---|
| $Li_aNi_{1-x-y}Co_xM_yO_2$ | [Formula 1], |
| $Li_aNi_{1-x-y}Co_xM_yO_{2-z}F_z$ | [Formula 2], |
| $Li_aNi_{1-x-y}Co_xM_yO_{2-z}S_z$ | [Formula 3], and | where M is a metal selected from the group consisting of Al, Mg, Sr, La, Ce, V, and Ti and wherein $0 \leq x \leq 0.99$, $0.01 \leq y \leq 0.1$, $0.01 \leq z \leq 0.1$ and $1.00 \leq a \leq 1.1$.

Also, the present invention further provides a method for preparation of the positive active material selected from the group consisting of the formulae 1 to 3.

The method comprises a step of synthesizing $Ni_{1-x-y}Co_xM_y(OH)_2$ by a coprecipitation method; a step of mixing the material with LiOH, LiF, or NaS powder; a step of producing the positive active compound of the formulae 1 to 3 by heating and cooling the mixture; and a step of coating the compound by using a metal alkoxide solution.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
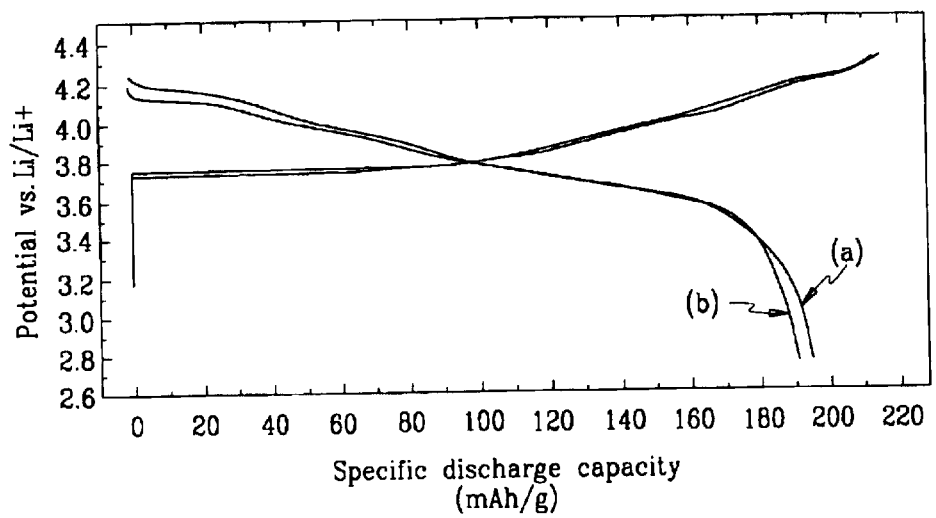
FIG. 1 is a graph showing the result of recharge properties after 1 cycle of a coin cell made of a) $Li_{1.02}Ni_{0.89}Co_{0.1}La_{0.01}O_2$ and b) $Li_{1.02}Ni_{0.89}Co_{0.1}La_{0.01}O_{1.95}F_{0.05}$ coated by an Al solution.

A preferred embodiment of this invention will be explained with reference to the accompanying drawings.

The present invention relates to a compound selected from the group consisting of compounds of the following formulae 1 to 3:

| | |
|---|---|
| $Li_aNi_{1-x-y}Co_xM_yO_2$ | [Formula 1], |
| $Li_aNi_{1-x-y}Co_xM_yO_{2-z}F_z$ | [Formula 2], |
| $Li_aNi_{1-x-y}Co_xM_yO_{2-z}S_z$ | [Formula 3], and | where M is a metal selected from the group consisting of Al, Mg, Sr, La, Ce, V, and Ti and wherein $0 \leq x < 0.99$, $0.01 \leq y \leq 0.1$, $0.01 \leq z \leq 0.1$ and $1.00 \leq a \leq 1.1$.

It is preferable that spherical or quasi-spherical $Ni_{1-x-y}Co_xM_y(OH)_2$ powder coprecipitating metals selected from the group consisting of Al, Mg, Sr, La, Ce, V, and Ti be used for preparing the compound.

$Ni_{1-x-y}Co_xM_y(OH)_2$ is synthesized by a coprecipitation method. A solution is prepared comprising metal salts selected from the group consisting of Al-salt, Mg-salt, Sr-salt, La-salt, Ce-salt, V-salt, Ti-salt, Ni-salt, Co-salt to prepare the $Ni_{1-x-y}Co_xM_y(OH)_2$. At this very point, preferably, the concentration of the metal salt is approximately 2.5 M and water is used as a solvent.

$NH_4OH$ as a binder and NaOH as a precipitant are continuously supplied to the prepared metal solution in an overflowable reactor.

At this time, a temperature of reactor is preferably maintained at about 50° C. and the pH in the reactor is preferably maintained between 11–12. Also, it is preferable that the mole ratio of supplied metal and $NH_4OH$ range from 1:0.4 to 1:1 and that these materials in the reactor are reacted, while being agitated at 900 rpm.

A spherical or quasi-spherical $Ni_{1-x-y}Co_xM_y(OH)_2$ powder to be dried is obtained after rinsing the overflow reacted reaction precipitant with water or a diluted acid solution until it is neutralized.

A homogeneous mixture is produced by agitating the prepared $Ni_{1-x-y}Co_xM_y(OH)_2$ powder with LiF or NaS powder in an equivalent ratio in an mortar agitator for 10 to 30 minutes.

The powder mixture is then heat-treated at 600 to 800° C. for 22 hours, with dry air being blown in a gas atmosphere controlled furnace to synthesize the positive active powders of the above formulae 1 to 3.

The heat-treatment step is preferred by elevating the temperature at a rate of 1 to 5° C./min, and then allowing the powder to naturally cooldown after maintaining it at the heat-treatment temperature for a fixed period of time. It is not preferable that the heatreating temperature is above 900° C. because of lithium's decomposition.

The prepared powder is dried after being coated using 1 to 30% by weight of a metal alkoxide solution prepared by dissolving a metal alkoxide powder in alcohol.

As for the coating method using the metal alkoxide solution, there are, for example, common methods such as sputtering, Chemical Vapor Deposition (CVD), and dip coating method. However, it is preferable to use the dip coating method, as it is the most convenient method since it only requires dipping the powder in the solution and then drawing it out again.

Metal alkoxide solutions as used above are prepared by refluxing the mixture after the metal is mixed with alcohol in 1 to 30 weight percent mixture of the relevant metal in the alcohol. Herein, methanol or ethanol can be used as the alcohol.

Also, it is possible to use Mg, Al, Co, K, Na, Ca, Si, Ti, and V as the to metal, but it is preferable to use Mg. At this time, it is not preferable that the concentration of the metal is below 1 weight percent since the coating effect does not occur on the compound powder selected from the group consisting of the compounds of the formulae 1 to 3, and that the concentration of the metal is above 30 weight percent since the thickness of metal alkoxide coated layer is too thick.

It is preferable that the thickness of the above surface-treated layer be between 1 to 100 nm. If the thickness of the surface-treated layer is more than 100 nm, thick electric properties deteriorate, although an improving effect on stability is seen.

Also, an improved effect on the durability of the battery is considered to be brought about because the metal oxide coating on the surface of the active material prevents the active material from contacting electrolyte.

After the surface-treatment, the powder is heat-treated at 200 to 1000° C. for 2 to 30 hours. Then, Li secondary battery positive active material of said formulae 1 to 3 coated with metal oxide. Following the surface-treatment, the heat-treatment time is preferably about 10 hours, and the heat-treatment temperature is preferably 300 to 500° C. After selecting a particle of the material of said compounds from the formulae 1 to 3 prepared with a surface-treatment using a metal alkoxide solution, a quantitative and qualitative analysis was performed. The analysis used was Secondary Ion Mass Spectroscopy (SIMS), which can analyze quantitatively and qualitatively metal existing on the surface of the active material by detecting emitted secondary ions when irradiated with an electron beam. This analysis determined that metal existed only on the surface of said compounds of the formulae 1 to 3 that were coated with metal alkoxide.

The present invention is explained in more detail with reference to the following examples.

EXAMPLE 1

$Li_aNi_{1-x-y}Co_xLa_yO_{2-z}F_z$ (wherein $0 \leq x \leq 0.99$, $0.01 \leq y \leq 0.1$, $0.01 \leq z \leq 0.1$ and $1.00 \leq a \leq 1.1$) was prepared and then surface-treated with metal alkoxide.

First, $Ni_{0.89}Co_{0.1}La_{0.01}(OH)_2$ was synthesized by a coprecipitation method to prepare $Li_{1.02}Ni_{0.89}Co_{0.1}La_{0.01}O_{1.95}F_{0.05}$.

To prepare $Ni_{0.89}Co_{0.1}La_{0.01}(OH)_2$, the solution comprising La-salt, Ni-salt, Co-salt was prepared. At this time, the concentration of total metal was about 2.5 M and water was used as solvent.

$NH_4OH$ as a binder and NaOH as a precipitant were continuously supplied to the prepared metal solution in an overflowable reactor.

The temperature of reactor was maintained about at 50° C. and the pH of the inner of reactor was maintained between 11 to 12. The mole ratio of $NH_4OH$ and supplied metal ranged between 1:0.4 to 1:1, and the materials in the reactor were reacted while being agitated at 900 rpm.

A spherical or quasi-spherical $Ni_{0.89}Co_{0.1}M_{0.01}(OH)_2$ powder to be dried was obtained after rinsing the overflow reacted reaction precipitant with water or a diluted acid solution until it was neutralized.

A homogeneous mixture was produced by agitating it in a mortar agitator for about 10~30 minutes after measuring out LiOH and LiF powder in an equivalent ratio.

$Li_{1.02}Ni_{0.89}Co_{0.1}La_{0.01}O_{1.95}F_{0.05}$ was prepared by heat-treating mixed powder at 700° C. for 20 hours, with dry air circulating in a gas atmosphere controlled furnace.

Positive active material, $Li_{1.02}Ni_{0.89}Co_{0.1}La_{0.01}O_{1.95}F_{0.05}$ surface-coated with $Al_2O_3$ was produced

EXAMPLE 2

Using the method for the preparation the positive active material according to example 1, $Li_{1.02}Ni_{0.89}Co_{0.1}Mg_{0.01}O_{1.95}F_{0.05}$ powder coated with $Al_2O_3$ was produced by the same method and conditions of the example 1, except the positive active material being produced was $Li_{1.02}Ni_{0.89}Co_{0.1}Mg_{0.01}O_{1.95}F_{0.05}$.

EXAMPLE 3

After $Li_{1.02}Ni_{0.89}Co_{0.1}La_{0.01}O_{1.95}F_{0.05}$ powder was produced by the same method of preparation as in example 1, the prepared powder was coated by using 15 weight percent aluminium isopropoxide solution prepared by dissolving aluminium isopropoxide powder in alcohol and then drying it. $Li_{1.02}Ni_{0.89}Co_{0.1}La_{0.01}O_{1.95}F_{0.05}$ coated with $Al_2O_3$ was produced by heat-treating the material under conditions of dry air circulating at 900° C. for 10 hours.

EXAMPLE 4

After the $Li_{1.02}Ni_{0.89}Co_{0.1}La_{0.01}O_{1.95}F_{0.05}$ powder was produced by the same method of the preparation as in example 1, the prepared powder was coated by using 15 weight percent of aluminium isopropoxide solution prepared by dissolving aluminium Isopropoxide powder in alcohol and then drying it.

$Li_{1.02}Ni_{0.89}Co_{0.1}La_{0.01}O_{1.95}F_{0.05}$ coated with $Al_2O_3$ was produced by heat-treating the material under conditions of dry air circulating at 900° C. for 10 hours.

COMPARATIVE EXAMPLE 1

The positive active material of $Li_{1.02}Ni_{0.89}Co_{0.1}La_{0.01}O_2$ was produced by the method of example 1, except for the coating process by a metal alkoxide solution.

To prepare $Li_{1.02}Ni_{0.89}Co_{0.1}La_{0.01}O_2$, $Ni_{0.89}CO_{0.1}La_{0.01}(OH)_2$ synthesized by a coprecipitation method and LiOH were homogeneously mixed by agitating the materials for 10 to 30 minutes in a mortar agitator.

$Li_{1.02}Ni_{0.89}Co_{0.1}La_{0.01}O_2$ was produced by heat-treating the mixed powder at 700° C. for 20 hours, with dry air circulating in a gas atmosphere controlled furnace.

COMPARATIVE EXAMPLE 2

$Li_{1.02}Ni_{0.88}Co_{0.1}La_{0.02}O_2$ was produced by the method of the preparation of comparative example 1, except for the changing of the composition ratio of La from 0.01 to 0.02.

COMPARATIVE EXAMPLE 3

$Li_{1.02}Ni_{0.89}Co_{0.1}Mg_{0.01}O_2$ was produced by the method of example 2 except for the coating process by the metal alkoxide solution.

To prepare $Li_{1.02}Ni_{0.89}Co_{0.1}Mg_{0.01}O_2$, $Ni_{0.89}Co_{0.1}Mg_{0.01}(OH)_2$, prepared according to coprecipitation method of the example, and LiOH powder were mixed by agitation for 10 to 30 minutes in a mortar agitator in an equivalent ratio.

$Li_{1.02}Ni_{0.89}Co_{0.1}Mg_{0.01}O_2$ was produced by heat-treating the mixture powder at 700° C. for 20 hours with dry air circulating in a gas atmosphere controlled furnace.

COMPARATIVE EXAMPLE 4

$Li_{1.02}Ni_{0.88}Co_{0.1}Mg_{0.01}O_2$ was produced by the method of preparation of comparative example 3, except for the changing of the composition ratio of Mg from 0.01 to 0.02.

COMPARATIVE EXAMPLE 5

$Li_{1.02}Ni_{0.89}Co_{0.1}La_{0.01}O_2$ was produced by the following the method. After $Ni_{0.89}Co_{0.1}La_{0.01}(OH)_2$ was synthesized by coprecipitation, it was mixed with LiOH powder by agitation for 10 to 30 minutes in a mortar agitator in an equivalent ratio.

$Li_{1.02}Ni_{0.89}Co_{0.1}La_{0.01}O_2$ was produced by heat-treating the powder mixture at 700° C. for 20 hours, with the dry air circulating in a gas atmosphere controlled furnace.

The prepared powder was coated by using 5 weight percent aluminium isopropoxide solution prepared by dissolving aluminium isopropoxide powder in alcohol and then dried. $Li_{1.02}Ni_{0.89}Co_{0.1}La_{0.01}O_2$ coated with $Al_2O_3$ was produced by heat-treating the material under conditions of dry air circulating at 300° C. for 10 hours.

The prepared powders according to the methods of example 1, 2, 3, 4 and comparative example 1, 2, 3, 4, 5 were structurally analyzed by X-ray diffaction (XRD), the powder particles are observed with a Scanning Electron Microscope (SEM) and the properties of the powders were confirmed by SIMS and TEM.

DISCHARGE PROPERTY EVALUATION

The discharge properties of coin type half-cell of the positive active material prepared by the method of example 1, 2, 3, 4 and comparative example 1, 2, 3, 4 and 5 were evaluated.

For the preparation of the half-cells, 3 weight percent carbon (product name: Super P) was used as a conductor and 3 weight percent polyvinyllidenefluoride (product name: KF-1300) was used as a binder.

The coin type half-cell was consisted of a pole plate prepared by tape-casting positive active material, conductor, and binder on an Al-foil with NMP solvent, and lithium metal as an opposite pole plate.

The capacity and durability properties of the active material prepared according to the present invention were tested.

For a test of the discharge properties, the half-cells were tested under condition of discharging a constant 0.1 C, 0.2 C, 0.5 C, and 1 C between 2.75 V and 4.3 V for one 100 times.

The FIGS. 1 to 5 show the results of the discharge property tests.

Figure 3:
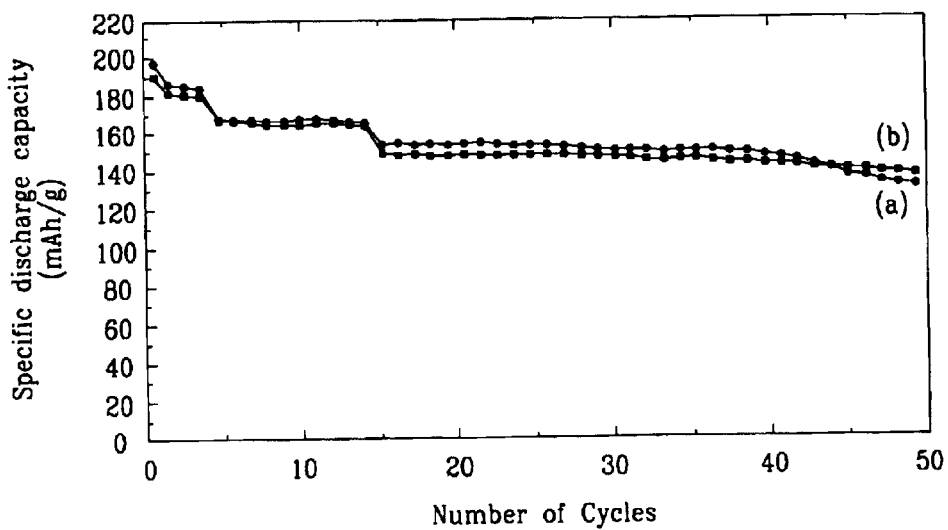
FIG. 3 is a graph showing the result of recharge properties after 50 cycles of a coin cell made of a) $Li_{1.02}Ni_{0.89}Co_{0.1}La_{0.01}O_2$ and b) $Li_{1.02}Ni_{0.89}Co_{0.1}La_{0.01}O_{1.95}F_{0.05}$ coated by an Al solution and heat treated at 300° C.

FIG. 1 shows the result of a property test of discharge for 1 cycle of (a) $Li_{1.02}Ni_{0.89}Co_{0.1}La_{0.01}O_2$ of comparative example 1 and of (b) $Li_{1.02}Ni_{0.89}Co_{0.1}La_{0.01}O_{1.95}F_{0.05}$ of example 1 heat-treated at 300° C. after receiving a surface-treatment with alkoxide solution, and FIG. 3 shows the results of a property test of discharge for 50 cycles of (a) and (b) of FIG. 1 at a rate of 1 C, which indicate that $Li_{1.02}Ni_{0.89}Co_{0.1}La_{0.01}O_2$ is better than $Li_{1.02}Ni_{0.89}Co_{0.1}La_{0.01}O_{1.95}F_{0.05}$ by a capacity of 3 mAh/g for the first discharge, but that $Li_{1.02}Ni_{0.89}Co_{0.1}La_{0.01}O_{1.95}F_{0.05}$ is better than $Li_{1.02}Ni_{0.89}Co_{0.1}La_{0.01}O_2$ by about 10% for a discharge after 50 cycles.

Figure 2:
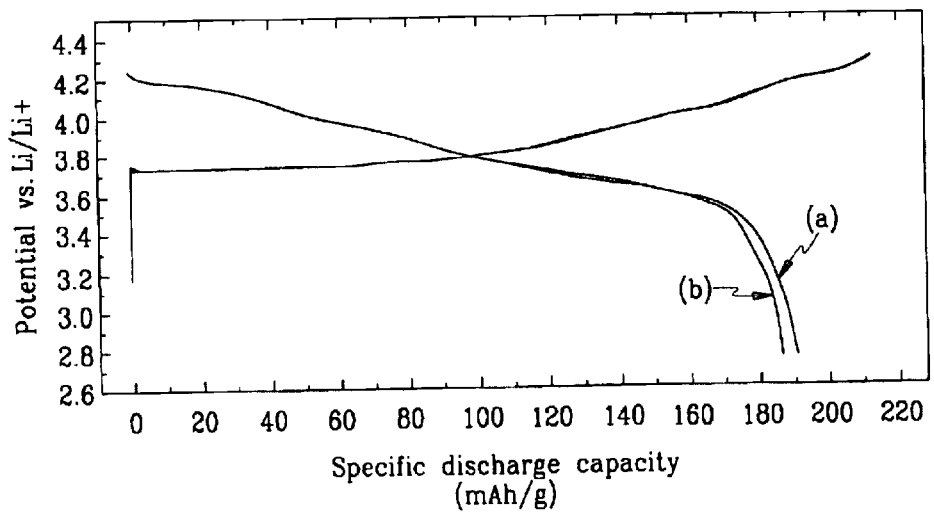
FIG. 2 is a graph showing the result of recharge properties after 1 cycle of a coin cell made of $Li_{1.02}Ni_{0.89}Co_{0.1}La_{0.01}O_{1.95}F_{0.05}$ Al solution coated and not coated.
Figure 4:
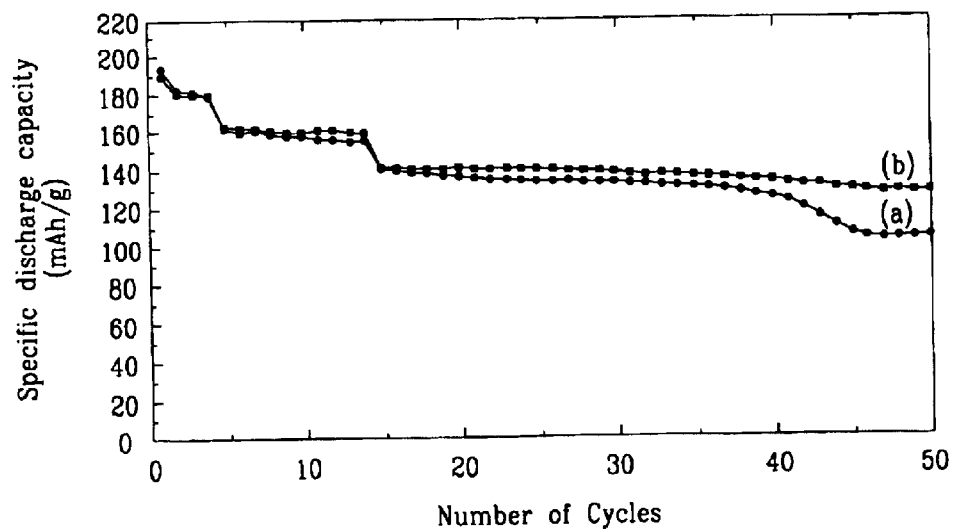
FIG. 4 is a graph showing the result of recharge properties after 50 cycles of a coin cell made of an Al solution of coated and not coated $Li_{1.02}Ni_{0.89}Co_{0.1}La_{0.01}O_{1.95}F_{0.05}$

Also, FIG. 2 and FIG. 4 show at the first discharge capacity and the discharge capacity at 50 cycles at a rate of 1 C for $Li_{1.02}Ni_{0.89}Co_{0.1}La_{0.01}O_{1.95}F_{0.05}$ (a) without surface-treatment (b) with a surface-treatment with Al-alkoxide solution, and indicate that the first discharge capacity of the surface-treated material is decreased by 1% less than the non surface-treated material, but the durability of the surface-treated material is greater by about 20% from 74% to 92% than the non surface-treated for 50 cycles.

Figure 5:
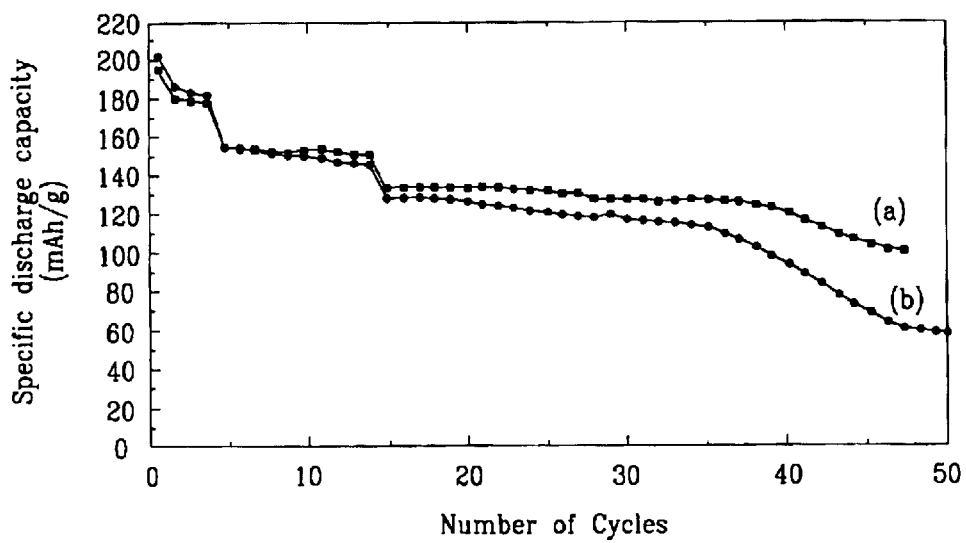
FIG. 5 is a graph showing the result of recharge properties after 50 cycles of a coin cell made of an Al solution of coated and not coated $Li_{1.02}Ni_{0.89}Co_{0.1}La_{0.01}O_2$.

FIG. 5 shows the result of the durability testing when discharging $Li_{1.02}Ni_{0.89}Co_{0.1}La_{0.01}O_2$ (a) surface-treated with Al-alkoxide solution and (b) non surface-treated for 50 cycles at a rate of 1 C, and indicates that the durability of the surface-treated material is greater by about 20% from 61% to 82% than the non surface-treated material.

According to the present invention, the use in a lithium secondary battery of $Li_aNi_{1-x-y}Co_xM_yO_2$, $Li_aNi_{1-x-y}Co_xM_yO_{2-z}F_z$ (where M is a metal selected from the group consisting of Al, Mg, Sr, La, Ce, V, and Ti and wherein $0 \leq x < 0.99$, $0.01 \leq y \leq 0.1$, $0.01 \leq z \leq 0.1$ and $1.00 \leq a \leq 1.1$) that have been powder surface-treated treated with metal alkoxide and heat-treated decrease the initial discharge capacity by about 1% more than do non surface-treated materials, but increase the discharge capacity by about 20% more than the non surface-treated materials for high current conditions of a 1 C discharge rate over 50 cycles. Therefore, the present invention can provide a positive active material having a long durability and a high capacity for lithium secondary batteries.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a lithium secondary battery of which the surface is coated with a metal oxide, wherein the positive active material compound comprises $Li_aNi_{1-x-y}Co_xM_yO_2$ and M is a metal selected from the group consisting of Sr, La, Ce, and V, and $0 \leq x < 0.99$, $0.01 \leq y \leq 0.1$, and $1.00 \leq a \leq 1.1$, wherein the metal oxide coated on the surface of the compound excludes Li and is an oxide of a metal selected from the group consisting of Mg, Ti, Al, V, Co, K, Ca, and B.

2. A positive active material according to claim 1, wherein the thickness of a layer coated on the surface of the compound is 1 to 100 nm.

3. The positive active material of claim 1, the surface is coated with the metal oxide by a dip coating method.

4. A positive active material for a lithium secondary battery of which the surface is coated with a metal oxide, wherein the positive active material compound comprises $Li_aNi_{1-x-y}Co_xM_yO_{2-z}F_z$ and M is a metal selected from the group consisting of Sr, La, Ce, and V, and $0 \leq x < 0.99$, $0.01 \leq y \leq 0.1$, $0.01 \leq z \leq 0.1$, and $1.00 \leq a \leq 1.1$, wherein the metal oxide coated on the surface of the compound is an oxide of a metal selected from the group consisting of Mg, Si, Al, K, Ca, and B.

5. The positive active material of claim 4, wherein the thickness of a layer coated on the surface of the compound is 1 to 100 nm.

6. A positive active material for a lithium secondary battery of which the surface is coated with a metal oxide, wherein the positive active material compound comprises $Li_aNi_{1-x-y}Co_xM_yO_{2-z}S_z$ and M is a metal selected from the group consisting of Al, Mg, Sr, La, Ce, V, and Ti, and $0 \leq x \leq 0.99$, $0.01 \leq y \leq 0.1$, $0.01 \leq z \leq 0.1$, and $1.00 \leq a \leq 1.1$.

7. The positive active material of claim 6, wherein the metal oxide coated on the surface of the compound is an oxide of a metal selected from the group consisting of Mg, Si, Ti, Al, V, Co, K, Co, Ca, Na, and B.

8. The positive active material of claim 6, wherein the thickness of a layer coated on the surface of the compound is 1 to 100 nm.

* * * * *